United States Patent [19]

Fukada et al.

[11] 4,295,172
[45] Oct. 13, 1981

[54] ROTARY MAGNETIC HEAD APPARATUS

[75] Inventors: Tetsuji Fukada, Nirakata; Yukihiko Ise, Toyonaka, both of Japan

[73] Assignee: Matsushita Electric Industrial Co., Ltd., Osaka, Japan

[21] Appl. No.: 92,375

[22] Filed: Nov. 8, 1979

[30] Foreign Application Priority Data

Nov. 10, 1978 [JP] Japan ............................ 53-139032
Nov. 27, 1978 [JP] Japan ............................ 53-146928
Feb. 16, 1979 [JP] Japan ............................ 54-17379

[51] Int. Cl.³ ..................... G11B 21/24; G11B 5/56; G11B 21/10
[52] U.S. Cl. .................... 360/109; 360/77; 310/332; 310/369
[58] Field of Search ............ 360/77, 109; 310/332, 310/369

[56] References Cited

U.S. PATENT DOCUMENTS 4,093,883  6/1978  Yamamoto ..................... 310/332
4,141,047  2/1979  Kambara et al. ................ 360/77

FOREIGN PATENT DOCUMENTS 607260  5/1978  U.S.S.R. ........................ 360/104

Primary Examiner—Robert S. Tupper
Attorney, Agent, or Firm—Stevens, Davis, Miller & Mosher

[57] ABSTRACT

A rotary magnetic head apparatus having a bending mode vibrator or vibrators mounted on a rotary cylinder, the vibrator comprising either ring shape piezoelectric vibrators bonded together with their polarization axes aligned in the direction of the thickness or the bonded piezoelectric vibrators bisected along a diameter of the ring, the bending vibrator mounting thereon a magnetic head or heads.

7 Claims, 13 Drawing Figures

ROTARY MAGNETIC HEAD APPARATUS

BACKGROUND OF THE INVENTION

1. Field of the Invention

This invention relates to a rotary apparatus having magnetic heads and more particularly to a rotary apparatus having a head mounting structure adapted to control the head position thereby to facilitate the tracking control of the magnetic head position during the operation of reproducing.

2. Description of the Prior Art

Conventional apparatuses used in magnetic recording and reproduction employ control signals recorded on a magnetic tape to control the positions of the pertinent rotating magnetic heads relative to the magnetic tape so as to obtain optimum tracking conditions for the recording and reproduction. This is because unfavorable tracking deviations are unavoidable on account of elongation or contraction of the magnetic tape or of the difference between individual recording and reproduction apparatuses used. Magnetic heads may also be swerved away from the track when the running speed of the magnetic tape is changed to switch over from one picture to another such as still, slow, and high-speed pictures, as the control signal is then unable to control the head positions. To prevent this, automatic tracking is used to bring the magnetic heads back to the center of the recorded track. In order to facilitate the automatic tracking, a conventional apparatus uses a means for adjusting the height of a magnetic head by means of two rectangular piezoelectric elements bonded to form a bimorph vibrator which is placed in between the magnetic head and the rotary drum motor shaft therefor. However, since the distance between the outside diameter of a cylindrical rotator and a drum motor shaft is short in such a rotary magnetic head apparatus, a proper movable range of the magnetic head necessary for optimum tracking is attainable only if the said bimorph vibrator is made very thin. Very thin piezoelectric vibrators are, however, not easy to manufacture, and, in addition, very fragile that they may be easily broken during such processes as mounting magnetic heads upon them and adjusting the positions of the magnetic heads. The fragility of the piezoelectric vibrators result in a lower manufacturing efficiency.

The present invention will eliminate the above mentioned drawbacks.

SUMMARY OF THE INVENTION

An object of the present invention is to provide rotary having magnetic heads apparatuses which comprise bending mode vibrators to maintain magnetic heads in optimum tracking conditions, and which can be manufactured, assembled, and adjusted in a high efficiency.

DESCRIPTION OF THE PREFERRED EMBODIMENTS

With reference now to FIGS. 1 through 7 the present invention will be explained in detail by way of the following examples.

Figure 1A:
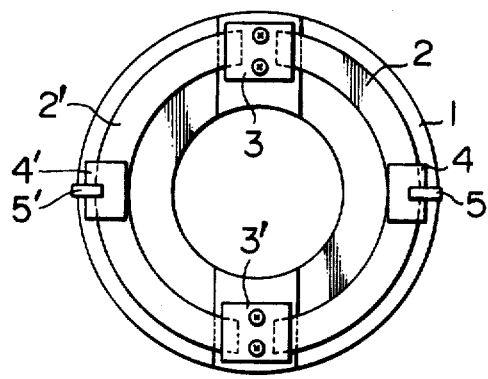
FIG. 1A is a plan view of a magnetic heads mounting structure for a rotary apparatus having magnetic heads according to the present invention.
Figure 1B:
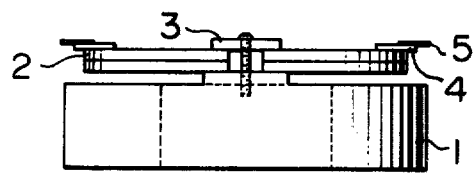
FIG. 1B is a front view of the structure shown in FIG. 1A.
Figure 2:
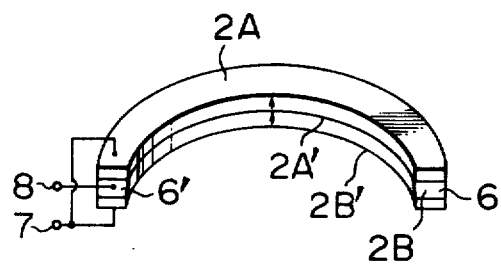
FIGS. 2 and 3 are perspective views of bending mode vibrators (hereafter referred to as bending bivrators) for rotary magnetic head apparatuses according to the present invention.

Refering more particularly to FIGS. 1A and 1B, mounted on a cylindrical rotator secured to a drum motor shaft are bending mode vibrators (hereafter referred to as bending vibrators) 2 and 2' with the opposed ends fixed by elements mounting members 3 and 3'. The bending vibrators 2 and 2' are each made up of two piezoelectric vibrators elements in hemi-ring shape (hereafter referred to as hemi-rings) bonded in a hemi-ring shape and constitute a ring shape piezoelectric vibrator. Intermediate to the ends of said bending vibrators 2 and 2' are magnetic-head substrates 4 and 4', respectively, which mount respective magnetic heads 5 and 5'. FIG. 2 shows that such a bending vibrator as 2 and 2' is formed of two hemi-rings bonded in such a way that the directions of the polarizations thereof (shown by arrows in the Figures) coincide. FIG. 2 also shows that portions 6 and 6' of one of the hemi-rings extend to provide an electrode at the interface between the upper and lower hemi-rings. When a DC voltage is applied across an electrode 7 connecting electrodes 2A with 2B' and an electrode 8 at the interface between 2A' and 2B, the bending vibrator with the ends fixed will be bent greatly to lower the magnetic head thereon. The present invention is designed to detect the tracking deviations of magnetic heads and feed the resultant signals corresponding to the deviations to a piezoelectric element driving circuit, and to feed the outputs from the circuit to the bending vibrators so that the vibrators thereof relocate the magnetic heads correctly for proper signal reproduction.

It should be noted that, in contrast to conventional bimorph vibrators using rectangular piezoelectric vibrators, ring shape vibrators have greater effective vibrator lengths and hence can be made thicker in achieving a predetermined vibrator amplitude, and therefore that the manufacturing efficiency will be improved since the thicker vibrators are more rugged and easy to manufacture and handle.

Figure 3:

FIG. 3 illustrates an example of a beding vibrator in hemi-ring shape in which the hemi-rings to be bonded together have different inner diameters so that one of them provides an interfacial electrode.

Figure 4:
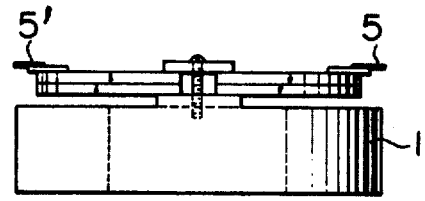
FIG. 4 is a front view of another embodiment of the invention for a mounting structure for a rotary magnetic head apparatus having magnetic heads.
Figure 5A:
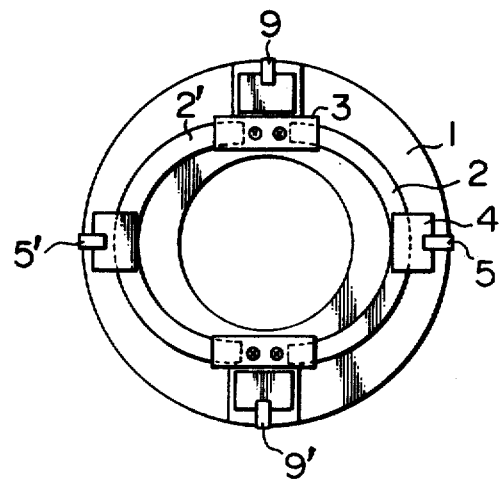
FIG. 5A is a plan view of another embodiment of the invention for a magnetic head mounting structure.
Figure 5B:
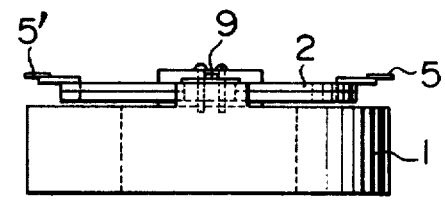
FIG. 5B is a front view of the structure shown in FIG. 5A.
Figure 6A:
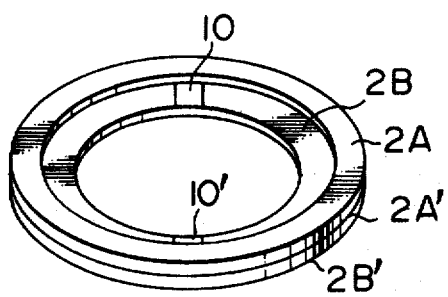
FIG. 6A is a perspective view of a bending vibrator according to the invention.
Figure 6B:
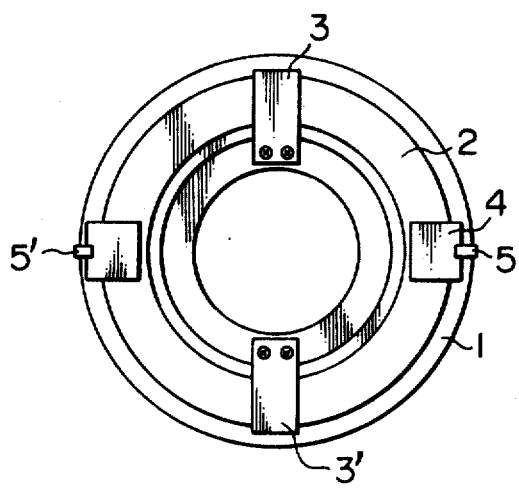
FIG. 6B is a plan view of a magnetic head mounting structure having the bending vibrator shown in FIG. 6A.
Figure 6C:
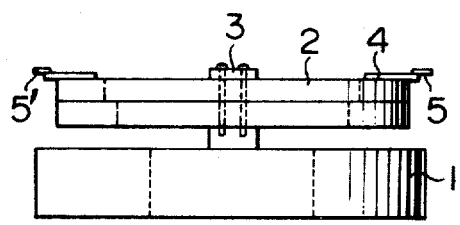
FIG. 6C is a front view of the structure shown in FIG. 6B.

FIG. 4 shows an example of a bending vibrator mounted on a cylindrical rotator with the polarizations of the two bending vibrators in hemi-ring shape being oriented in opposite directions. The arrows indicate the directions of the polarizations. In the example shown in the figure, a driving signal in phase when applied to the two bending vibrators results in the movement of the magnetic heads in the opposite directions. Such vibrators have a great advantage that they require only one drive circuit. FIGS. 5A and 5B illustrate an example having magnetic heads for recording 9 and 9' mounted on the cylindrical rotator. Since bending vibrators 2 and 2' have usual residual deviations, magnetic recording heads, if mounted on the vibrators and perform recording on a tape, will bring about track deviations when the tape is run in another reproducing apparatus, thereby loosing the interchangeability between such recording and reproducing apparatuses. In order to prevent this non-interchangeability, fixed magnetic heads are used for recording, and bending vibrators are used only for reproducing magnetic heads, as shown in FIGS. 5A and 5B. FIGS. 6A, 6B, and 6C illustrate examples utilizing two piezoelectric elements in ring shape. In FIG. 6A in particular, two piezoelectric elements in ring shape are bonded with the polarizations thereof being aligned in the same direction, and the electrodes 2A' and 2B at the interface thereof are angularly displaced from each other through 180°, with the ends of one electrode meeting the ends of the other at the separation points. The separated electrodes 10 and 10' are mounted on the cylindrical rotator 1 by the members 3 and 3'.

Figure 7A:
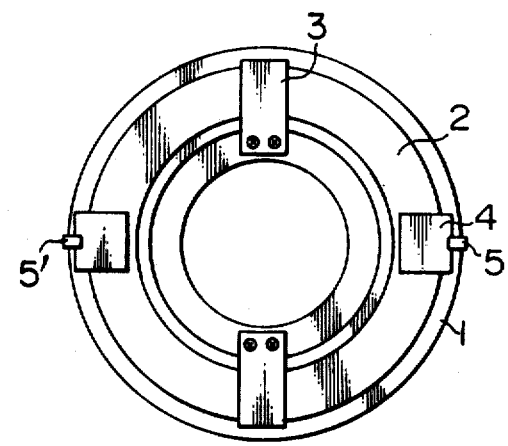
FIG. 7A is a plan view of still another embodiment of the invention for a magnetic head mounting structure.
Figure 7B:
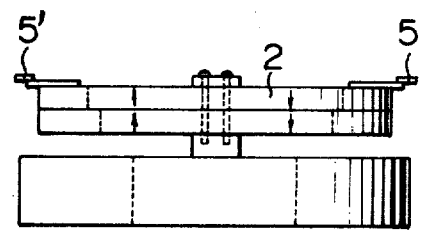
FIG. 7B is a front view of the structure of FIG. 7A.
Figure 7C:
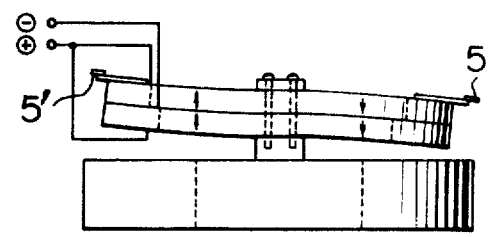
FIG. 7C is a front view of a bending vibrator according to the present invention.

While the aforementioned vibrators are made up of two piezoelectric elements in hemi-ring shape, this vibrator involves only one bending vibrator. Hence the difference in deviation characteristics of the vibrators in the former, which affects the heads thereon, need not be considered in the latter. Accordingly the drive circuit for the latter needs no correctional means necessary for the former for different deviation characteristics of the bending vibrators involved, and hence can be of simple structure. The magnetic heads, once mounted on the latter bending vibrator, can be easily fixed to the rotary cylinder and then require only simple adjustment. FIG. 7A shows another form of a piezoelectric vibrator in ring shape also made up of two ring shape vibrators bonded together, each, however, having bisected regions of mutually anti-parallel polarizations, as shown in FIG. 7B by the arrows. Such anti-parallel polarizations bisecting a ring shape element can be easily accomplished by bisecting the electrode therefor in two and applying to them DC voltages having opposite polarities. Thus, a DC voltage applied across the electrode at the interface and a common electrode connecting the electrodes on the outer surfaces of the vibrators, will cause the ring shape vibrator to bend in S-shape as illustrated in FIG. 7C. Since, in this case, the magnetic heads 5 and 5' can be deviated in opposite directions by a single drive circuit, advantageously only a set of two external electrodes is required.

In these embodiments polarizations of the piezoelectric vibrators are aligned in the same direction within each bonded vibrator. However, it is apparent that the polarizations may be aligned in the opposite direction as well.

According to the present invention piezoelectric vibrators used for optimum tracking conditions can be made in thick, rugged, and easily manufacturable forms with an improved manufacturing efficiency. The invention provides magnetic head apparatuses having variable-height magnetic heads which apparatuses require simpler drive circuits than conventional ones.

We claim:

1. A rotary support apparatus for magnetic heads which record and reproduce signals on magnetic tape, comprising two vibrators each of said vibrators supporting one of said heads, said vibrators formed respectively by bonding together two piezoelectric vibrator elements having a hemi-ring shape, the polarization axes of said elements being in parallel with the direction of the element thickness, said vibrators operating in a bending mode, and a cylindrical rotator supporting said vibrators.

2. A rotary support apparatus having magnetic heads as defined in claim 1, wherein said bonded two piezoelectric vibrators are cut symmetrically from one ring.

3. A rotary support apparatus having magnetic heads as defined in claim 1, wherein said bonded two piezoelectric vibrators consist of two hemi-rings having different inner diameters.

4. A rotary apparatus having magnetic heads as defined in claim 1, wherein said two vibrators operating in a bending mode are mounted on said cylindrical rotator so that said two vibrators have a bending mode opposite to each other in the direction of polarization.

5. A rotary apparatus having magnetic heads as defined in claims 1, 2, 3 or 4, wherein two magnetic heads for recording are mounted on said cylindrical rotator.

6. A rotary apparatus having magnetic heads as defined in claim 1, wherein said two vibrators combine to form a vibrator consisting of two piezoelectric elements in a ring shape with electrodes which are separated at the bonding portion.

7. A rotary apparatus having magnetic heads as defined in claim 6, wherein said vibrators are formed by bonding together two piezoelectric elements in a ring shape, each of them having bisected regions of mutually anti-parallel polarization.

* * * * *